(12) United States Patent
Nobbe (10) Patent No.: US 12,069,487 B1
(45) Date of Patent: Aug. 20, 2024

(54) SELF HEALING DYNAMIC RF NETWORK USING PHASED ARRAY ANTENNAS WITH COMMUNICATIONS NODES

(71) Applicant: Matrixspace Corporation, Burlington, MA (US)

(72) Inventor: Dan Nobbe, Crystal Lake, IL (US)

(73) Assignee: Matrixspace Corporation, Burlington, MA (US)

(*) Notice: Subject to any disclaimer, the term of this patent is extended or adjusted under 35 U.S.C. 154(b) by 291 days.

(21) Appl. No.: 17/326,046

(22) Filed: May 20, 2021

(51) Int. Cl.
*H04W 16/28* (2009.01)
*H04B 17/336* (2015.01)
*H04W 76/10* (2018.01)
*H04W 84/06* (2009.01)

(52) U.S. Cl.
CPC .......... *H04W 16/28* (2013.01); *H04B 17/336* (2015.01); *H04W 76/10* (2018.02); *H04W 84/06* (2013.01)

(58) Field of Classification Search
CPC ..... H04W 16/28; H04W 76/10; H04W 84/06; H04B 17/336
See application file for complete search history.

(56) References Cited

U.S. PATENT DOCUMENTS

| | | | |
|---|---|---|---|
| 9,524,648 B1 * | 12/2016 | Gopalakrishnan ... | G05D 1/0055 |
| 2018/0376275 A1 * | 12/2018 | Jiang ........................ | H01Q 3/36 |
| 2019/0339348 A1 * | 11/2019 | Greve .................... | H01Q 1/282 |

* cited by examiner

*Primary Examiner* — Eric Myers
(74) *Attorney, Agent, or Firm* — McAndrews, Held & Malloy, Ltd.

(57) ABSTRACT

A network of mobile nodes is described that use directional antennas in the mm wave region to communicate. The nodes form a self-healing network that is capable of forming new links between nodes to avoid interference. The network can also identify emitters that are emitting and locate them in space. The directional antennas can be electrically steered with narrow beams that allow for accurate measurement of position when combined with inertial or satellite location for at least one node in the network. The network can then adapt to the detected emitter.

20 Claims, 8 Drawing Sheets

SELF HEALING DYNAMIC RF NETWORK USING PHASED ARRAY ANTENNAS WITH COMMUNICATIONS NODES

BACKGROUND

Operation of an RF communication network in a dynamic, and sometimes hostile, RF environment poses many challenges, especially if the nodes in the network are highly mobile and the RF environment is rapidly changing. Each node is subject to interference, and the longer the distance to be covered, the more susceptible nodes are to interfering signals while power and antenna requirements increase.

SUMMARY

Proposed is a solution to this environment. Highly directional phased array antennas in the millimeter range combined with mesh networking offer the capability to electrically steer transmission and reception of radio frequency (RF) energy. "Mesh" routing allows a network of communications nodes to form ad hoc links through a network that is self-healing, in the sense that the network can discover alternate paths and form new connections if an existing path is disrupted.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Communications networks involve tradeoffs in range, bandwidth, power, and noise immunity. A mesh network is a form of network where the distance covered can be extended by hopping communications through intermediate nodes. Instead of hopping along a single path, a mesh topology allows a communication link to be set up on any of multiple paths through the mesh. A mesh routing protocol allows a link to be set up between any two nodes over any available path through the mesh. If a link is broken because of interference or loss of a node, the protocol establishes a new route through the mesh. Accordingly, a mesh network is resilient and self-healing.

Existing mesh network implementations use nodes that are largely static or operate with omni-directional antennas, and operate at relatively lower frequencies. The present disclosure contemplates a mesh network of fixed or highly mobile nodes, with a preferred embodiment that operates as a swarm of aerial nodes, where the mesh may choose paths that reject interference based on directional properties of the node antennas and their transmission and reception. In addition, the network is implemented with millimeter (mm) wave radios. Millimeter wave is high frequency, high-bandwidth, and thus offers higher data rates, than WiFi bands. The mm wave spectrum is also less crowded with competing applications, especially above the highest frequency cellular bands. Another advantage of mm wave is that antenna size decreases with increasing frequency, allowing for more sophisticated, higher gain antennas in smaller, lighter weight packages. Phased array antennas allow for increased gain, and in particular, by adjusting the phase and amplitude of each element in the array, the antenna gain can be adjusted and steered so that the antenna is highly directional and rapidly adjustable, an important feature for the highly dynamic nature of the disclosed mesh network.

In a mesh network of nodes with omni-directional antennas, an interfering RF emitter will continue to interfere with nearby nodes no matter how the node is oriented relative to the interferer. Even if the node is mobile, changing the orientation of the node or minor adjustments in location are unlikely to alleviate the interference. However, by using a mesh network with directional antennas, such as phased array antennas, for example, nodes that are being interfered with may steer their antennas' beam patterns towards a node that is in a direction with less interference, use or select a different route through the mesh network that uses nodes whose antenna orientation is not aligned with the source of interference, and/or adjust the beam pattern so that a notch or null in the beam pattern is aimed at the interferer while only losing a slight amount of gain relative to peak gain. Nearby nodes that are within range of the interferer may also make these adjustments to their beam pattern as well. This may be done at high speed, with physically moving the node in space maintained as another option.

Figure 1:
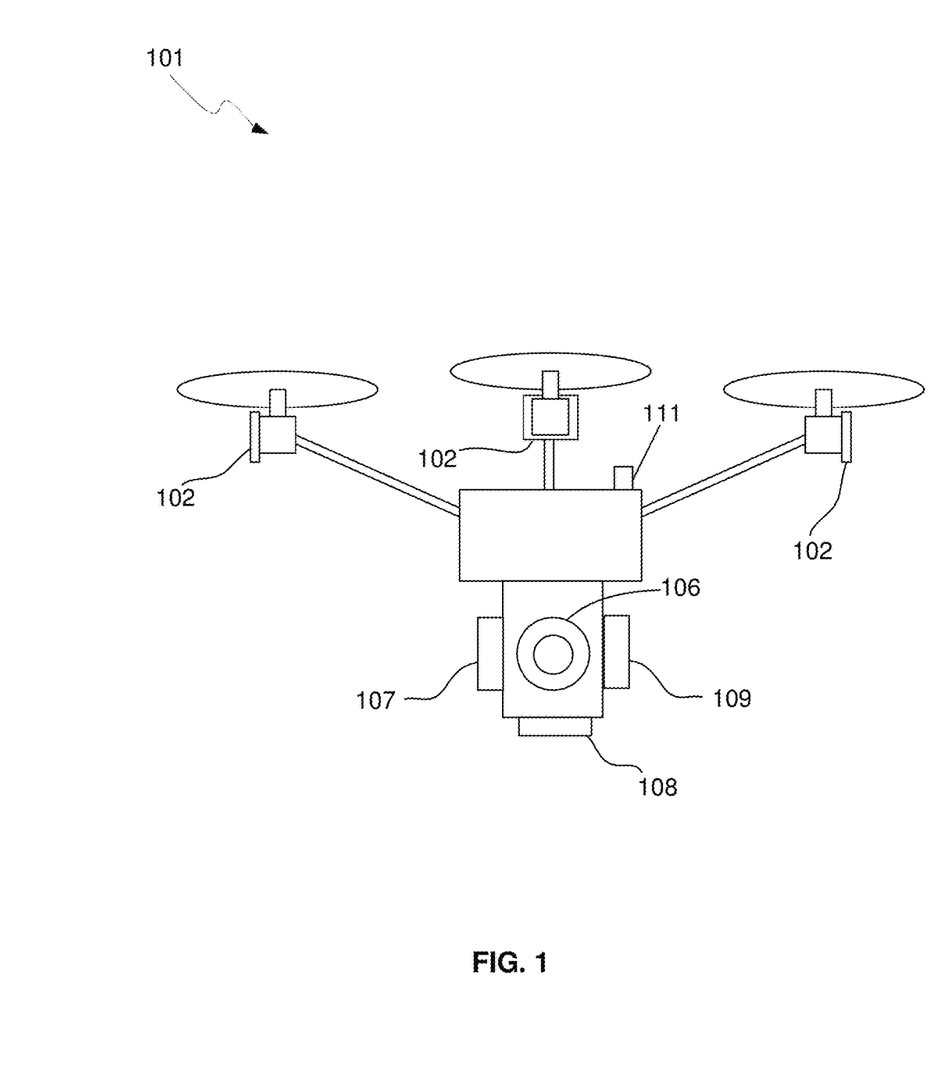
FIG. 1 shows an aerial drone that may be utilized in accordance with an example embodiment of the disclosure.

FIG. 1 shows an aerial drone that may be utilized in an accordance with an example embodiment of the disclosure. The drone 101 is not crewed, and is preferably lightweight with a useful payload on the order of 10 pounds. The drone is equipped with directional, planar phased array antennas 102. While FIG. 1 only has three motor/blade mechanisms visible, there is a fourth directly behind the front one, although a higher number may be utilized, such as six, eight, or twelve for example. The arrays 102 can be mounted on any convenient surface on the drone to achieve the desired coverage based on the capability of the array, as further explained herein.

The drone is also equipped with sensors for collecting information. In the embodiment shown, the sensors include an optical imager 106, an infrared sensor 107, a LIDAR imager 108, an acoustic sensor 109, radar, and software-defined radio (SDR) for RF spectral sensing. The drone may comprise additional hardware for guidance, including a satellite position system antenna 111 and an inertial "dead reckoning" accelerometer and magnetic compass (not shown). The phased array antennas may be of any size, but are shown as 4×4 arrays in this embodiment, with an element size designed for the millimeter wave range, generally in the range of 10 to 200 GHZ. While any operating frequency could be chosen, the preferred embodiment operates at 24 GHz. In this mode of operation, line of sight communication of the radio links described herein is reasonable out to a single digit mile radius, with link distances typically under one mile.

Altitude is an important parameter for locating the drone in space, and essential for avoiding terrain. The drone preferably employs a combination of techniques for determining and maintaining altitude. Laser range finding, such as LIDAR, provides fast and accurate altitude information provided visibility is good. An on-board pressure altimeter provides a secondary reference, and the phased array antennas 102 may be used to provide ranging information to points on the ground using trigonometry if the ground surface is sufficiently reflective. Satellite provided GPS may also provide an estimate of altitude above the surface of the earth. Combining all these sources and comparing them to an on board reference map of the area of operation provides an accurate assessment of current altitude and contributes to a refined assessment of the drone's absolute position in space, further described below.

Figure 2:
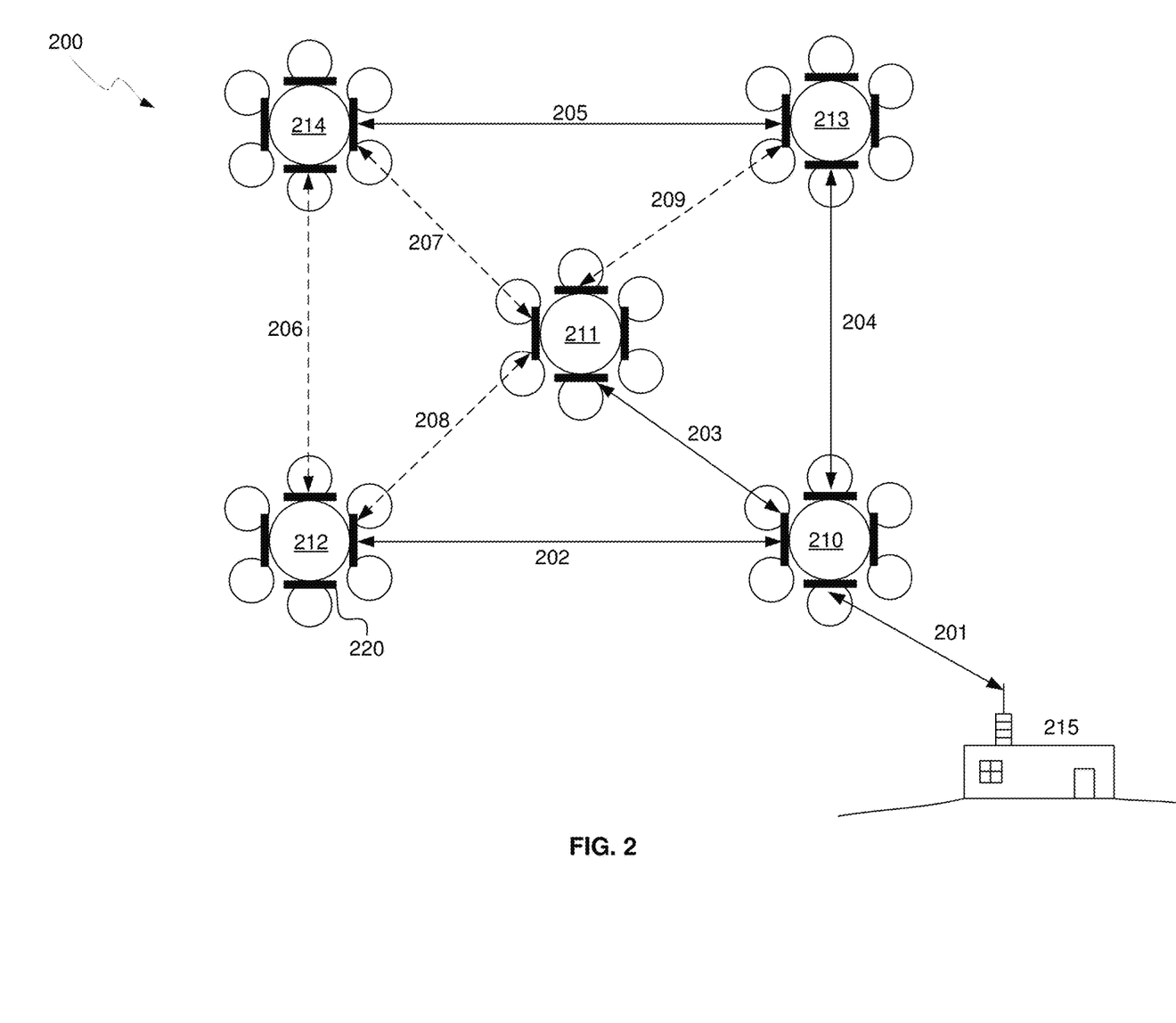
FIG. 2 shows a drone swarm that has formed a mesh network.

FIG. 2 shows a network 200 of aerial drones 210-214 forming a mesh network of links 201-209. Each of the drones 210-214 may comprise one or more phased array antennas 220, where the number of antenna arrays may ensure full 360 degree coverage. The network has a root at a ground or base station 215, which is shown as a static location but could also itself, be mobile. Dashed line links 206-209 represent alternate links between drones that are not active. Each drone acts as node in the network. It is not required that all nodes operate at the same frequency, and to avoid interference between nodes that are lined up such that a third further node is in the peak energy beam of a radio link between a first and second node, the network may employ several alternate neighboring frequencies.

FIG. 2 shows for illustrative purposes a drone swarm of unmanned aerial vehicles or drones. Each drone in the swarm is also a communications node and is equipped with one or more phased array, electrically steerable antennas and a transceiver operating in the millimeter wave region. Each drone may also be equipped with one or more sensors, such as optical, LIDAR, thermal, or acoustic sensors. The drones carry an on-board processor and memory for controlling the drone's movements, operating the sensors, and managing the transceiver. The drones also carry antennas and a processor for determining position based on satellite data ("GPS") and optionally an on-board inertial and magnetic (compass) sensor. The drones communicate with each other to form a mesh network of communication nodes with an RF link back to a root node, base station, or other target node in the network. The nodes respond to interference from jammers and obstacles by finding new paths through the mesh, steering the millimeter wave beam, re-positioning, or a combination of these techniques.

Path loss of a radio link increases proportional to the square of frequency. For example, going from 2.4 GHz which is roughly a common frequency for cell phones and 2.4 GHz WiFi to 24 GHz would result in a path loss that is 100 times higher, or 20 dB. Going from 2.4 GHz to 80 GHz would have a 30 dB increase in path loss. In a free space propagation condition, the path loss increases by 20 dB for every decade of distance. Therefore, going from 2.4 GHz to 24 GHz would reduce the link distance by a factor of 10, and the link distance for an 80 GHz link would decrease by a factor of 33. However, high frequencies have the benefit of very wide bandwidths and thus faster data rates. Additionally, the size of the antenna decreases with frequency (wavelength), enabling the use of more complex, higher gain antennae to combat the increase in path loss. Higher gain results from focusing the energy, thereby resulting in highly directional antennas.

The phased array antenna consists of numerous antenna that have their amplitude and phase adjusted to steer the beam by adjusting summation and cancellation of signals from various directions. The focusing of the energy, often in both azimuth and elevation, creates a higher gain antenna. However, the very focused beam is preferably pointed in the right direction to facilitate communication. Additionally, the focusing of the beam means the transmission/reception in directions away from the main beam is attenuated, which may enable the avoidance of interference.

Furthermore, the phased antenna arrays may help with isolation of communication channels such as transmitting in one direction and receiving in another. Phased array antennac utilize software to control the gain/phase of each antenna element for steering of the beam, where the system is aware of which direction to steer the beam. The beams may be steered by knowledge of relative GPS locations or drone formation which may be known based on a flight plan or shared over a communications link. The beams may also be steered by scanning the beam and/or with closed-loop tracking. One typical implementation of a phased array antenna uses a planar array of patch antenna elements, as shown with respect to FIG. 3A. This has the advantage of being flat and thus can fit well onto an aircraft without significant size and aerodynamic implications.

Figure 3A:
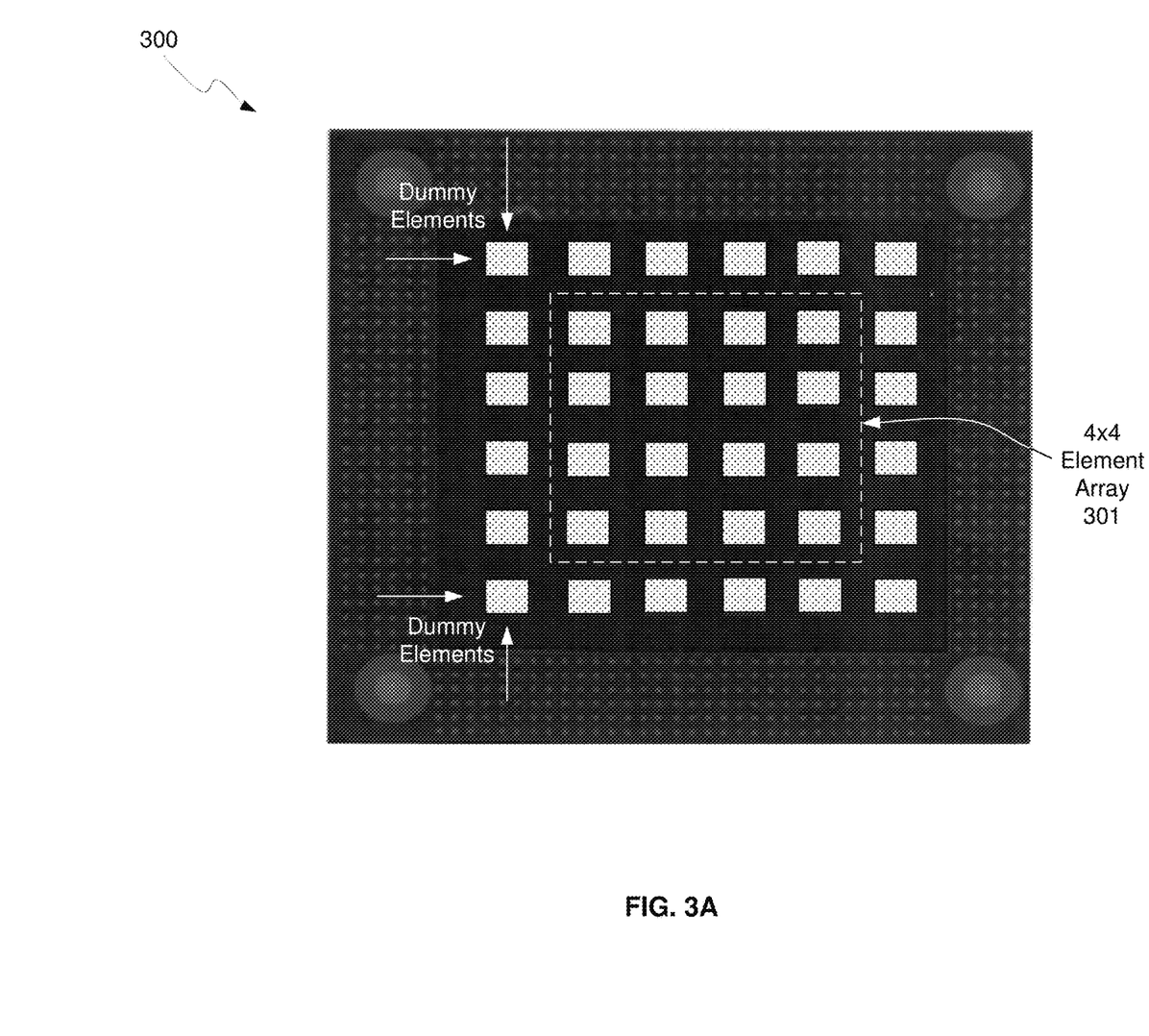
FIG. 3A shows a phased array antenna.

FIG. 3A shows a planar phased array antenna 300. The antenna 300 comprises 16 elements in a 4×4 element array 301, with an outer ring of "dummy" elements. The total area of the array can be relatively small, less than one square inch. Different arrays with varying numbers of elements will yield different patterns, with additional elements allowing for sharper peaks. While the array 301 in FIG. 3A has rectangular shaped elements, other shapes are possible, such as circles, squares, ellipses, and triangles, for example. Additionally, an array may be constructed using various antenna element types such as a Vivaldi antenna.

Figure 3B:
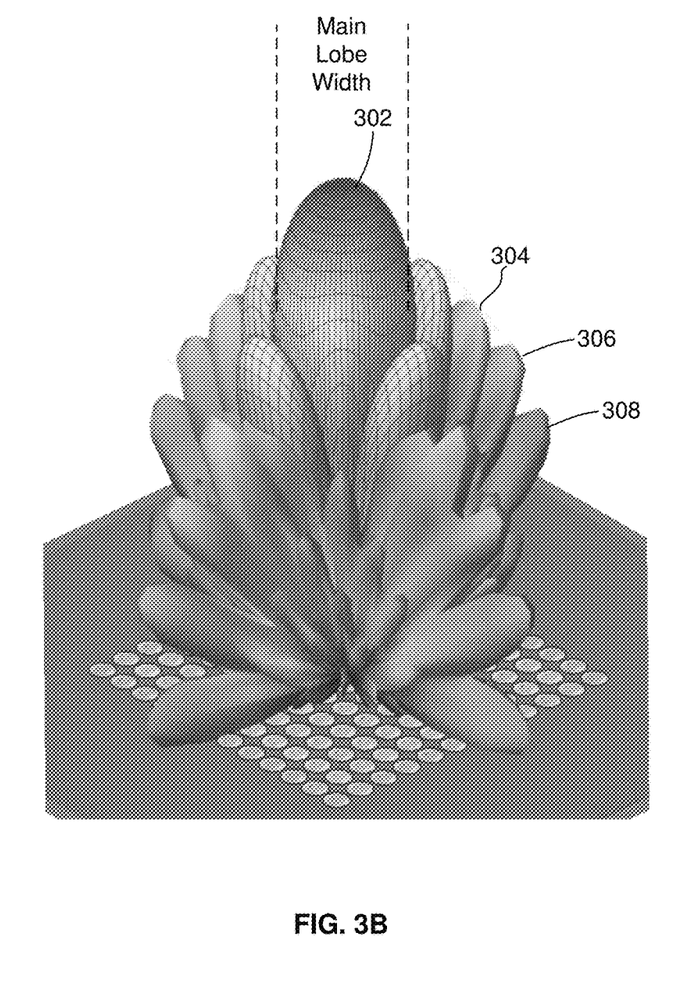
FIG. 3B shows an antenna pattern for a phased array antenna.

The pattern generated by array 301 of FIG. 3A is shown in a three dimensional view in FIG. 3B. The pattern shown in FIG. 3B has a main lobe 302 with sets of sidelobes 304, 306, and 308, with other smaller lobes and areas of near-zero gain between the main lobe and the sidelobes. The useful region of the pattern is indicated by the Main Lobe Width shown by the dotted lines, representing a roughly one decade roll off from the peak at 302. The entire pattern can be moved horizontally or vertically by electrically "steering" the phased array 301, with a useful range of +/−45 degrees or more in any direction. The steering may be accomplished by adjusting the phase or phase and amplitude of the signal going to each element in the array 301.

The combination of multiple steerable antennas with multiple nodes in the network allows for rapid self-healing in the presence of interference or other degradation that causes a node to node link to become unavailable. The antenna 300 can be rapidly steered to point to a different node in the mesh, and likewise antennas that are receiving interference can be rapidly steered away so they are no longer pointed at an interfering transmitter. In a similar fashion, communications can be routed to different nodes by activating a different antenna on a different face of a node and turning off the antenna that is being interfered with entirely.

The 4×4 array shown is approximately 0.75 square inches and may be electrically "steered" up to 45 degrees from normal to its surface without significantly impairing the beam pattern's gain at its center point 302. Also of significance is the ability to steer not just the "peak" gain of the beam, but the ability to steer "null" points in the beam pattern. This allows the antenna to be both steered to point at a transmitter or emitter of interest while steering the null in the pattern towards an emitter that is interfering.

By providing four antennas on each of four faces of a drone 210-214, the ability to steer +/−45 degrees from normal allows each node to aim at least one antenna in any direction in the horizontal plane and through 90 degrees of the vertical plane. Coverage for the cones above and below the drones 210-214 could be provided with a fifth and sixth array mounted on the top and bottom of the drones 210-214.

A node may want to know if it is subject to interference. The planar, directional phased array antennas provide a beneficial way to scan for interfering signals. When a link such as 204 is not active, the drone 210 can observe the RSSI level which can be considered a background RSSI, and scan the antenna through all or portions of its available steering range. The minimum RSSI level detected may represent a non-interference or low interference case, while other particular scan directions would result in an increased background RSSI level. The node could identify the direction and also the amount of the background noise increase. This is enabled by the directionality and scanning properties of the antenna. A similar background RSSI level measurement using an omnidirectional antenna cannot determine if a given background reading is due to interference, gain variations in the receiver, or variations in the detector.

Figure 4A:
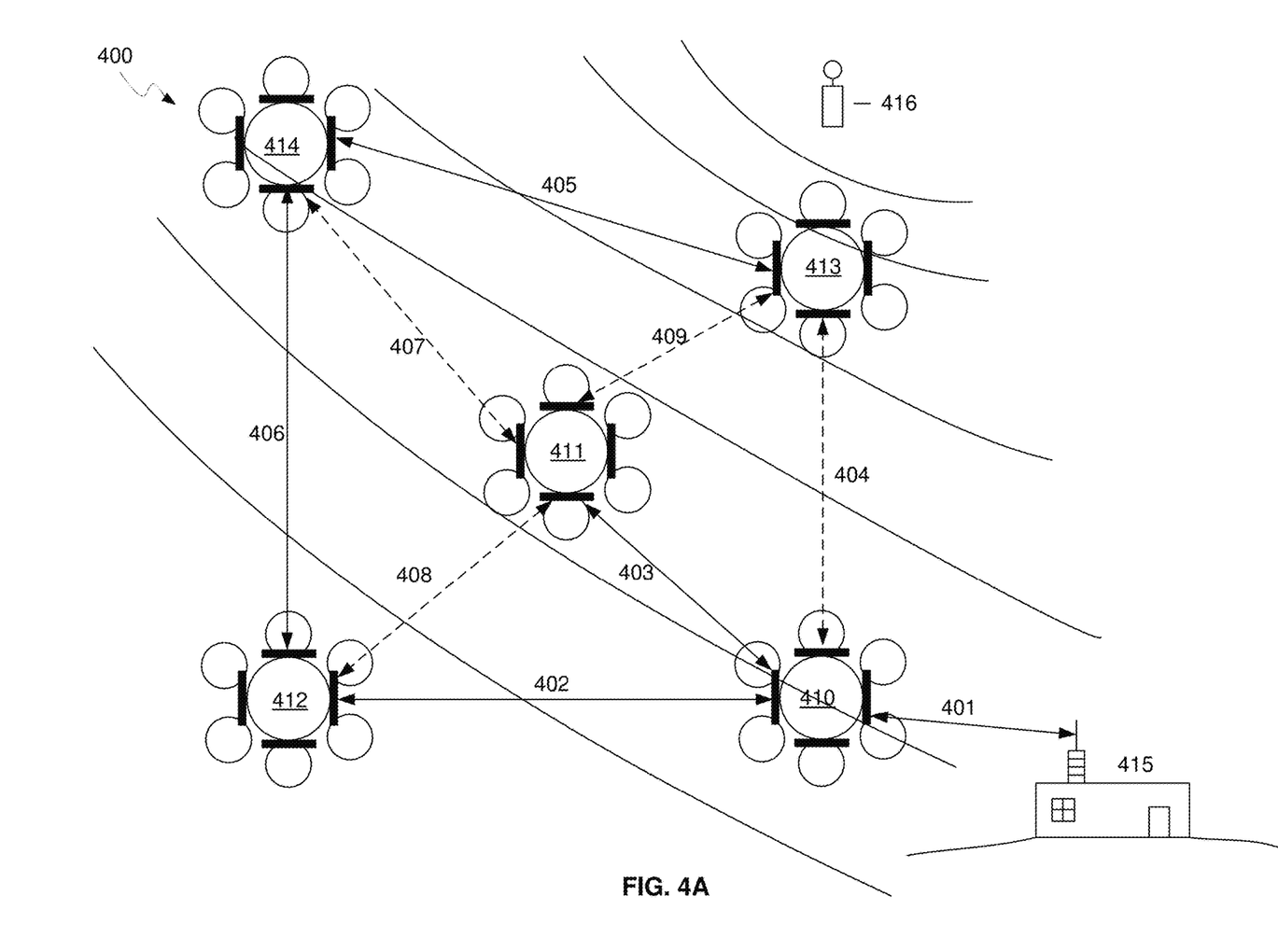
FIGS. 4A and 4B show a mesh network in the presence of interference.

FIG. 4A shows the drone network in the presence of an interfering signal 416. All of the paths between the nodes that could have been utilized before the interferer 416 was present are shown in dashed or solid line. The interfering signal could be an unintentional interferer, such as a system operating on an adjacent or the same frequency, or an intentional "jamming" interferer, designed to disrupt the network. Alternatively, a link could be disrupted by the interposition of an obstacle, such as a building or terrain. In FIG. 4A, the interferer 416 is broadcasting omni-directionally. Because of antenna orientation in this configuration, the interfering signal may disrupt links 404, 408, and 409, as each of these links has at least one antenna generally pointing towards the interferer 416 when the antenna is pointed or steered toward a neighboring node. Link 407 is dashed in this example as it is not needed to provide a link to node 414, since it has links 405 and 406.

Even with links 404, 408, and 409 possibly compromised due to the interferer 416, node 413 would still be connected to the mesh network 400 in this scenario due to the directional antenna capability of the nodes and the ability of the mesh network to route around unavailable links. In this example, the antenna on node 414 may need to be steered slightly away from node 413 to minimize the interference impact and steer the beam pattern of the antenna directly at the corresponding antenna of node 413 on link 405.

The controller in each drone may assess the relative signal quality of the link based on link metrics such as error rate or relative strength of the background interference signal. The received signal at a directional antenna on a drone during operation of a link will have a measured RSSI (Received Signal Strength Indication). When the link is not operating, the background environment will cause a second, typically significantly lower, RSSI. In the presence of a jammer or other interfering signal, however, the RSSI during periods when the link is not operating will rise. The controller may apply a cutoff metric to switch the node to an alternate path when the ratio of RSSI during operation of the link to the background RSSI falls to an unacceptable level.

If in the presence of interference, drone 413 determines that its links 404 and 409 may no longer be available, and the mesh protocol reports the unavailability of link 408. Drone 413 needs a new path through the drone network to base station 415, although it is not a requirement that paths be traced to a base station. Communication links may be established using the mesh topology between any two nodes, and the use of a link to a base station is illustrative. The controller for drone 413 operates with the network to find a new path back to the root node 415 using a self-healing mesh protocol. In addition, any of the drones may move in space and/or change the directionality of its antennas to reconfigure the network 400. In the illustrative case of FIG. 4A, drone 413 is routed through link 405, 406, and 402 to drone or node 410, and thence over link 401 to base station 415.

Note that if the nodes use non-directional antennas, more links will be compromised in the presence of interference. The level of interference rejection with directional antennas is limited by the ratio of the main lobe to the sidelobes. That parameter can be altered by adjusting the size and shape of the array and the number of elements in the array to optimize the main lobe to sidelobe ratio.

Any of the drones 411-414 may improve the link in the presence of interference by one or more of: steering the phased array antenna in the active link to orient a null towards the jammer, physically orienting the planar array surface in a more favorable direction relative to the jammer, or moving the drone in space relative to the jammer. In some instances, moving one or more of the drones may also help eliminate the interference.

Figure 4B:
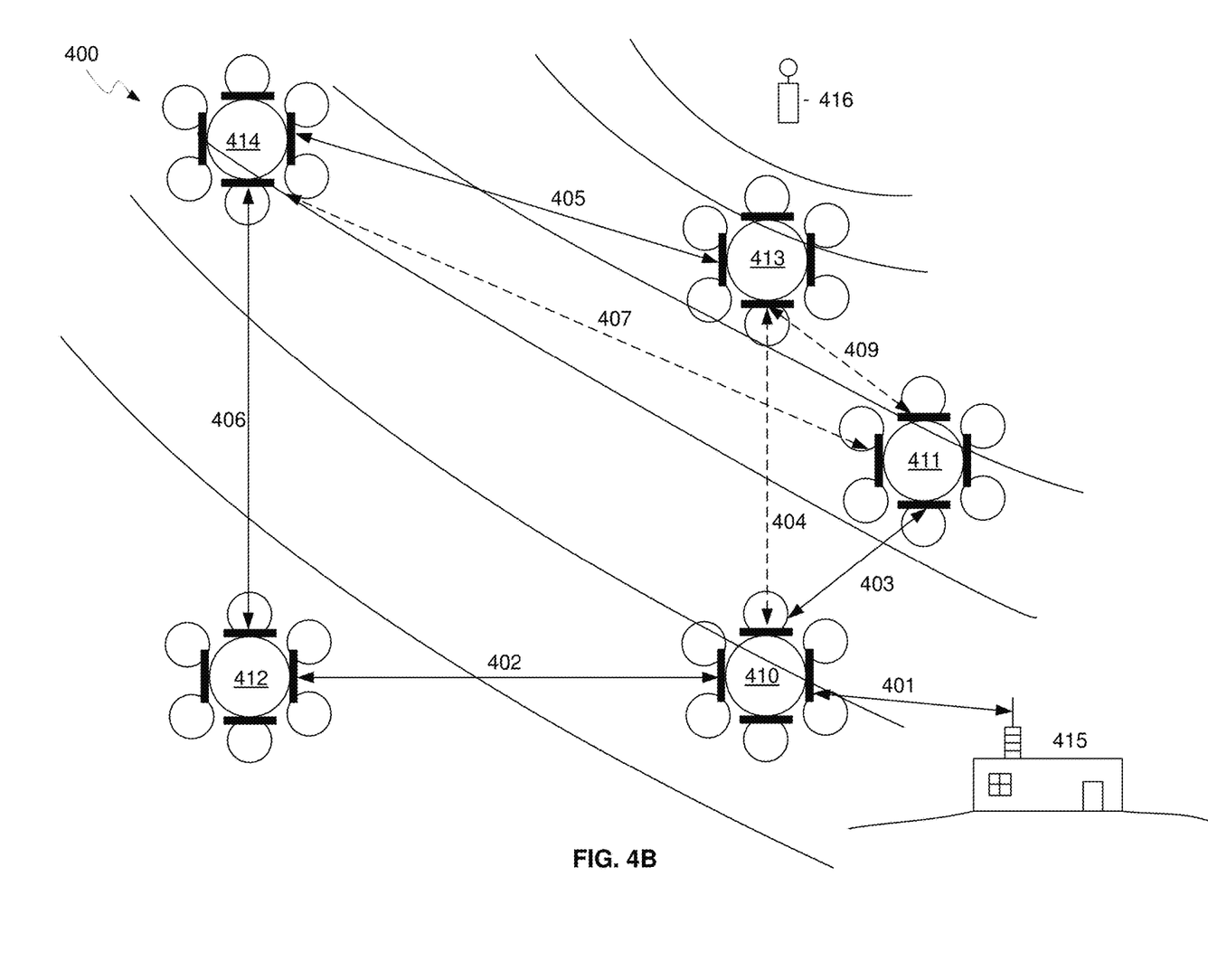

In another example, the drone 411 may change its location, for example moving towards the right of the diagram or east, as shown in FIG. 4B as compared to FIG. 4A, such that its directional antennas may be reoriented to transmit and receive in a direction away from the interferer 416, so that the interfering signal would not be received. In this manner, each of the nodes is still connected to the network and to the fixed node 415, with only link 404 having an interfered path. Links 407 and 409 may be utilized, but are not needed in this example as each node is connected via other links. Drone 411 is now able to connect directly to node 410 due to shortening the range and beam steering the respective antennas on drones 410 and 411 so they are off axis with the interferer 416.

There are many options for the network 400 to overcome interference due to the directionality of the antennas and the mobility of the drones. Each of the drones can move in a lateral direction and/or move to a different elevation to avoid the interfering signal or place the interfering signal in a beam null while directing the beam maximum gain at the desired target. Similarly, each drone may physically rotate to provide even further flexibility in the transmission/reception direction.

Figure 5A:
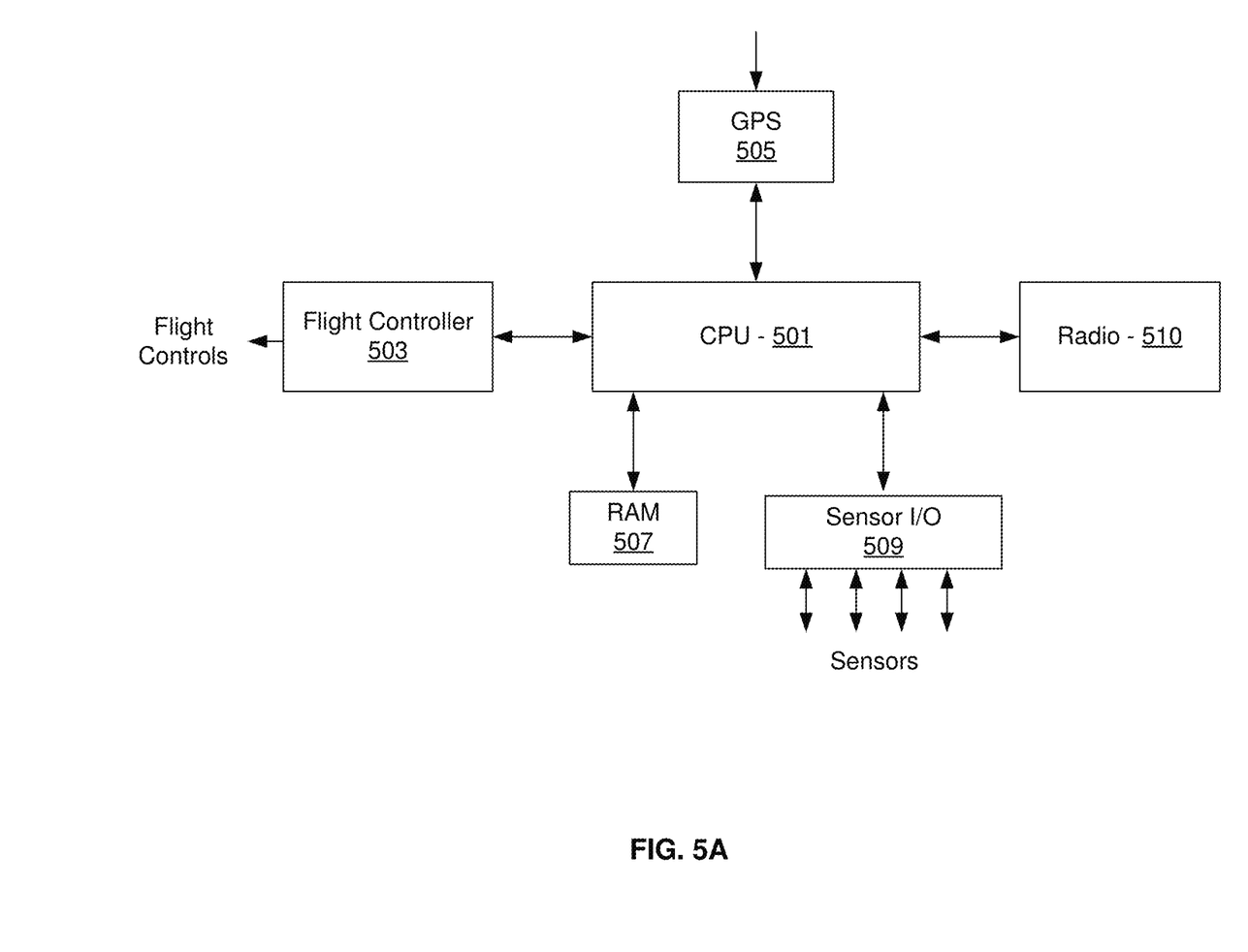
FIG. 5A shows a block diagram of the electronics package for a drone, in accordance with an example embodiment of the disclosure.

FIG. 5A shows a block diagram of the electronics package for a drone 101. Power for the electronics and flight controls may be supplied by a rechargeable battery, while the drone's primary lift (propellers/rotors) can be driven either electrically or by combustion. The CPU 501 is preferably a microprocessor with instructions carried in on-board Read Only Memory, with an external RAM and/or non-volatile memory 507 for storing sensor data and mission specific data.

The electronics may also comprise flight controller 503 for controlling the primary lift as well as any other flight-specific hardware. The GPS block 505 may comprise circuitry for receiving signals from GPS satellites for triangulating the position of the drone. The radio 510 may comprise the phased array antennas and associated circuitry, as illustrated in FIG. 5B.

Figure 5B:
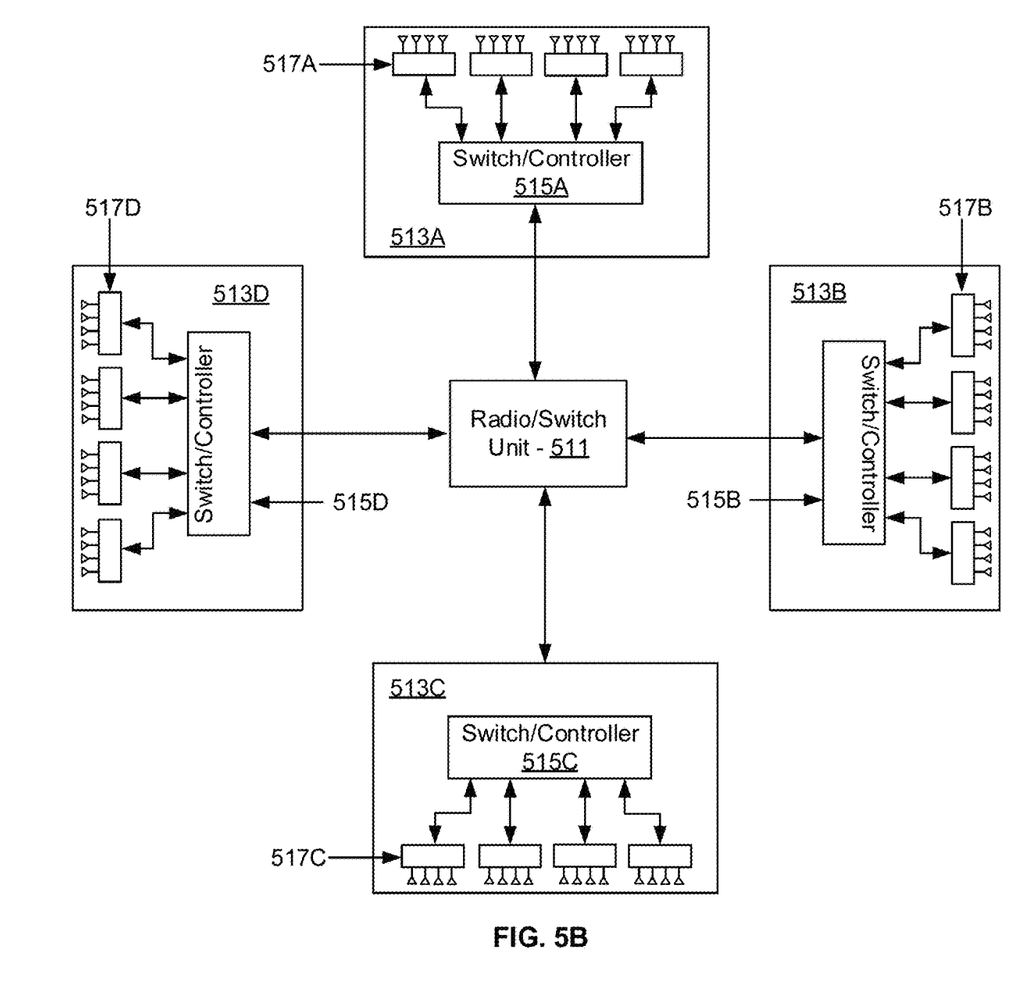
FIG. 5B is a block diagram of drone radio circuitry, in accordance with an example embodiment of the disclosure.

FIG. 5B shows a block diagram of one example implementation of a radio architecture, showing four independently controlled phased array antenna units 513A-513D and associated radio and switch unit 511. In one example embodiment, the radio/switch unit 511 comprises a software defined radio (SDR), although other types of radios are possible. Each antenna unit 513A-513D may comprise a switch/controller 515A-515D for enabling the configuration of beam patterns of the four antenna element columns 517A-517D and for switching on and off the elements, depending on desired direction of transmission and reception, and power savings. It should be noted that any number of arrays may be utilized based on their electronic scanning range and/or presence of mechanical scanning.

The SDR radio 511 can be configured so that it controls only one array at a time in order to save cost. Alternatively, the SDR radio 511 can be configured as four radios allowing for continuous, 360 degree coverage in the x/y plane in real time. Other combinations or ratios of radios to antennas are possible. For example, six SDR radios combined with planar antennas 301 mounted on a top and bottom surface of a drone 101 would provide spherical coverage in real time, provided that the antennas have useable steering of +/−45 degrees from normal. An array can be designed for +/−60 degree steering such that 360 degree coverage can be provided with three arrays 301 having a steering angle of +/−60 degrees and the drone 101 can then be provided with three sides having a normal direction offset from each other of 120 degrees as opposed to the square configuration with the faces of arrays 301 offset at 90 degrees from each other shown.

It should be noted that the beam pattern for each antenna can be controlled in two dimensions, x and y, so for a given orientation of the drone, the beam pattern can be angled down or up as well as side to side. This allows the controller to enable a drone to avoid interference not just by moving horizontally, but vertically as well, for example to gain elevation over terrain or buildings, or to further orient an interfering source into a null area of the antenna beam pattern. The ability to point the antenna beam towards the ground is also useful for the purpose of locating the interfering source, as further described herein.

The configuration of the mesh network may be done autonomously by selecting links that survive the impact of the interferer. Further amounts of intelligence can be added to the system. Various options comprise: first, one drone that knows its location (ex. GPS), orientation of the drone, and relative angle where the interferer is found. This would determine a vector along which the interferer would lie, and would be an absolute vector referenced to earth coordinates. Second, the two or more drones, that know drone locations (ex. GPS), know orientation, and know angle of arrival from the interferer can pinpoint an absolute spot since the drone locations are known, using geometry and the reference map. Third, where two or more drones know location and time of arrival of the interferer the network can again pinpoint an absolute spot since the drone locations are known. Two drones would define arcs of possible locations, with three or more drones capable of resolving a location based on the intersection of possible arcs. The time of arrival may be determined by looking for a signature in the interferer and determining when that signature arrives at the different drones. The signature may be a pulse, a modulation signature, or any other temporal event. The timing would be relative to a common timing reference such as a GPS-derived timing reference.

The fourth example comprises the situation where two or more drones that know a relative relationship by knowing link angles between the drones, the angles to the interferer, and the distance between the two nodes based on timing differences. This would be an interference location that is relative to the drone frame of reference, not an absolute geographic reference. Finally, one or more drones that identify angle of arrival of the interferer (from known locations and orientations), may create its own baseline by moving and then checking the new angle towards the interferer to triangulate the location.

Additional methods, including combining triangulation and time of arrival information, can be used to determine the interferer's location. The advantage of determining the interferer's location is that the mesh links may be optimized to avoid the interferer. This optimization can include steps such as choosing links and routes that do not have antennas aligned with the interferer, adjusting antenna patterns to minimize the effects of the interferer, and possibly relocating drones to improve the links (i.e. link directions not aligned with the interferer). Furthermore, other mesh network optimizations are possible such as optimizing mesh routing to reach all nodes with the minimum number of hops or best overall throughput.

The antenna pattern adjustments may include techniques such as adjusting gain and phases of antenna elements to improve sidelobe suppression or place nulls in the direction of the interferer or possibly steering the main lobe slightly away from the desired direction if this action helps to place a null or reduced sidelobe in the direction of the interferer. In this case, the signal may decrease by a small amount but the link would be improved because the interferer would decrease by a larger amount. Any of these techniques may be used by a drone or node in an open loop fashion, meaning that the node wouldn't know the location of the interferer and would try different settings until the link is improved. However, by knowing that an interferer is present, the node may try different steps. For example, the node may focus on steering the main beam to maximize signal, but if the node knows an interferer is present it may try techniques to alter the antenna for interference rejection. The mesh can also respond by adjusting link usage to avoid the interferer. In the case where the interferer's location is known, more careful and calculated responses can be taken. For example, the nodes may know precisely how to adjust antennas and overall the mesh would make use of links that are not compromised or subject to the interference. Furthermore, node locations could be moved to minimize the interference effects.

In one mode of operation, the drone swarm may operate to locate interfering sources. A known technique for finding the location of an observed object is baseline triangulation. By establishing a baseline between two points, and then measuring the angle towards an unknown target relative to the baseline from two points along the baseline, the location of the unknown point may be determined by trigonometry. A characteristic of the present network is that the nodes operate on a common clock, deriving timing from a GPS accurate source. With a common clock and at millimeter wave frequencies, the baseline distance between any two nodes that are in communication may be readily determined by measuring the time of arrival of the signal between the two nodes. Those two nodes can then scan for interfering signals by steering the antenna over a region of interest and determining the vector or offsetting angle that corresponds to a peak in the received energy from the interfering signal. The neighboring drone may also perform the same scan, and communicate the resultant vectors to neighboring drones as well. This information may be combined in the controller and the relative position of the interfering transmitter is mapped accurately in three dimensional space by computing a triangulated trigonometric solution and combining it with the known absolute reference location and orientation of the drone based on GPS data, inertial guidance, and magnetic orientation.

In another scenario, because an omnidirectional interferer will have different times of arrival at each drone, the time of arrival of a signature signal will define a curved surface on which the interfering transmitter lies. Combining time of arrival information from three or more drones is sufficient to isolate the interfering transmitter's location and relative strength as long as at least one drone in the formation has accurate absolute position information. Absolute position information can be continuously updated based on GPS positioning of each drone, or based on relative offset from a fixed base station location that is known with precision, since at millimeter wave frequencies that angle and distance between each drone can be determined with a reasonable degree of precision as long as the drone has a working link through the network.

In another variation, a single node may provide the multiple directional data points to locate an emitter by moving in space or translating from one position to another. For example, based on a first determined angular direction of a signal's arrival, the node can translate itself in a direction roughly orthogonal to the angle of arrival of the signal of interest until the angle either changes sufficiently to perform a triangulation calculation. In this way, a single node can maneuver to develop its own baseline for triangulation. Because the drones can gain altitude as well as move in the x/y plane, such a baseline can be formed as a vertical baseline as well. A sufficiently accurate stored map of the surface in the area of operation combined with an altitude determination of the drone above ground level could also be sufficient to triangulate an interferer location if the emitter is assumed to be on the surface. Altitude could be determined by on board GPS, pressure altimeter, or laser range finding such as LIDAR 108. Alternatively, the node can translate and measure angle of arrival combined with time of arrival to perform a calculation based on spherical distance.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mesh network comprising:
  a first node comprising a first directional antenna with a first main lobe,
  a second node comprising a second directional antenna with a second main lobe, and
  a third node comprising a third directional antenna having a third main lobe,
  the first node configured to orient the first directional antenna to the second directional antenna and the second node configured to orient the second directional antenna to the first directional antenna in a first configuration such that a first communications link is directly between the first directional antenna and the second directional antenna,
  the first node configured to orient the first directional antenna to the third directional antenna in a second configuration such that a second communications link is directly between the first directional antenna and the third directional antenna,
  the second node configured to orient the second directional antenna to the third directional antenna in the second configuration such that a third communications link is directly between the second directional antenna and the third node, and
  wherein:
  in the first configuration the first communications link is disrupted by an interfering signal, and
  in the second configuration neither of the second communications link nor the third communications link is disrupted by the interfering signal, and
  the mesh network is configured to switch from the first configuration to the second configuration in response to a relative signal quality of the first communications link and the interfering signal.

2. The mesh network of claim 1, the first direction antenna, the second directional antenna, and the third directional antenna each comprise a useful region,
  wherein the useful region of each of the first directional antenna and the second directional antenna in the first configuration receives a higher level of interference than the useful region of each of first directional antenna, the second directional antenna, and the third directional antenna in a second configuration.

3. The mesh network of claim 1, wherein the useful region comprises an area of the main lobe with a gain within a factor of 10 from a gain of a peak of the main lobe.

4. The mesh network of claim 1, wherein the second communications link and the third communications link have less interference than the first communications link.

5. The mesh network of claim 1, further comprising the first main lobe and/or the second main lobe in a direction of the interfering signal in the first configuration.

6. The mesh network of claim 1, further comprising:
  the third directional antenna oriented toward the first directional antenna in the first configuration, and
  the third directional antenna oriented toward the second directional antenna in the second configuration.

7. The mesh network of claim 6, further comprising:
the third main lobe oriented toward the first main lobe in the first configuration, and
the third main lobe oriented toward the second main lobe in the second configuration.

8. The mesh network of claim 1, further comprising:
the first directional antenna oriented toward the second node and the second directional antenna oriented toward the first node in the first configuration,
wherein the first main lobe is oriented toward the second node and the second main lobe is oriented toward the first node.

9. The mesh network of claim 1, further comprising:
the first main lobe oriented toward the third node and the second main lobe oriented toward the third node in the second configuration.

10. The mesh network of claim 9, wherein the third main lobe alternates between orienting toward the first node and the second node.

11. The mesh network of claim 9, wherein the third directional antenna isolates communication channels to transmit in a first direction and receive in a second direction.

12. The mesh network of claim 9, the third node further comprising a fourth directional antenna having a fourth main lobe, and the mesh network further comprising, in the second configuration, the third main lobe oriented toward the first node and the 4th main lobe oriented toward the second node.

13. The mesh network of claim 1, wherein:
in the second configuration, the interfering signal received by the second directional antenna is smaller than data received by the second directional antenna through the third communications link, and
in the first configuration, the interfering signal received by the second directional antenna is larger than data received by the second directional antenna through the first communications link.

14. The mesh network of claim 1, wherein the interfering signal is from an independent source.

15. The mesh network of claim 1, wherein the interfering signal is from an omni-directional antenna.

16. The mesh network of claim 1, wherein the first, second, and third directional antennas are phased-array antennas.

17. The mesh network of claim 1, wherein software controls a gain and a phase of each directional antenna lobe and a steering direction of each directional antenna.

18. The mesh network of claim 1, wherein the software uses relative GPS location data to determine the steering direction of each directional antenna.

19. The mesh network of claim 1, further comprising a controller in each of the first node, the second node, and the third node;
wherein each controller assesses a relative signal quality of a respective communications link based on link metrics, the link metrics comprising at least one of: error rate and relative strength of the interference signal.

20. The mesh network of claim 19, wherein each controller operates using a self-healing mesh protocol.

\* \* \* \* \*